(12) United States Patent
Wang

(10) Patent No.: US 11,029,481 B2
(45) Date of Patent: Jun. 8, 2021

(54) LENS MODULE

(71) Applicant: AAC Technologies Pte. Ltd., Singapore (SG)

(72) Inventor: Hailong Wang, Shenzhen (CN)

(73) Assignee: AAC Optics Solutions Pte. Ltd., Singapore (SG)

( * ) Notice: Subject to any disclaimer, the term of this patent is extended or adjusted under 35 U.S.C. 154(b) by 185 days.

(21) Appl. No.: 16/530,979

(22) Filed: Aug. 2, 2019

(65) Prior Publication Data

US 2020/0057238 A1 Feb. 20, 2020

(30) Foreign Application Priority Data

Aug. 15, 2018 (CN) .......................... 201821313311.3

(51) Int. Cl.
*G02B 7/02* (2021.01)
*G02B 1/04* (2006.01)

(52) U.S. Cl.
CPC .............. *G02B 7/021* (2013.01); *G02B 1/041* (2013.01)

(58) Field of Classification Search
CPC .......... G02B 7/021; G02B 1/041; G02B 3/04; G02B 7/022; G02B 13/0045; G02B 13/0035; G02B 13/003; G02B 13/00; G02B 7/02; G02B 7/026
See application file for complete search history.

(56) References Cited

U.S. PATENT DOCUMENTS

| | | | | |
|---|---|---|---|---|
| 5,612,826 A | * | 3/1997 | Ohshita | G02B 7/022 359/811 |
| 2009/0015945 A1 | * | 1/2009 | Chen | G02B 7/021 359/819 |
| 2011/0102901 A1 | * | 5/2011 | Lin | G02B 7/022 359/601 |
| 2013/0027788 A1 | * | 1/2013 | Yen | G02B 13/0045 359/763 |
| 2013/0050850 A1 | * | 2/2013 | Lin | G02B 7/021 359/738 |
| 2014/0029114 A1 | * | 1/2014 | Kim | G02B 7/021 359/709 |
| 2014/0104691 A1 | * | 4/2014 | Chang | G02B 13/0035 359/611 |
| 2015/0092270 A1 | * | 4/2015 | Wang | G02B 7/022 359/503 |
| 2015/0198777 A1 | * | 7/2015 | Yan | G02B 7/021 359/793 |

(Continued)

*Primary Examiner* — Balram T Parbadia
(74) *Attorney, Agent, or Firm* — W&G Law Group LLP

(57) ABSTRACT

A lens module includes a lens barrel, and a lens group having a first and second lenses. An image side surface of a first barrel wall includes a first planar surface, a first oblique surface obliquely extending from the first planar surface, and a second planar surface extending from the first oblique surface. An object side surface of a peripheral portion of the first lens includes a second oblique surface attached to the first oblique surface and a fourth planar surface attached to the second planar surface. An image side surface of the peripheral portion of the first lens includes a fifth planar surface, a third oblique surface obliquely extending from the fifth planar surface, and a sixth planar surface extending from the third oblique surface towards the optical axis. An object side surface of the second lens includes a seventh planar surface and a fourth oblique surface.

12 Claims, 5 Drawing Sheets

(56) References Cited

U.S. PATENT DOCUMENTS

| | | | |
|---|---|---|---|
| 2015/0260941 A1* | 9/2015 | Yan .................. | G02B 7/003 |
| | | | 359/771 |
| 2015/0260942 A1* | 9/2015 | Yan .................. | G02B 7/021 |
| | | | 359/771 |
| 2015/0260943 A1* | 9/2015 | Yan .................. | G02B 7/021 |
| | | | 359/771 |
| 2016/0085046 A1* | 3/2016 | Kim .................. | G02B 7/026 |
| | | | 359/830 |

* cited by examiner

LENS MODULE

TECHNICAL FIELD

The disclosure relates to the field of camera lenses, and in particular, to a lens module.

BACKGROUND

With the continuous development of technology, electronic devices are becoming more and more intelligent. In addition to digital cameras, portable electronic devices such as tablets and mobile phones are also equipped with lens modules. In order to meet people's needs, higher requirements are raised on the image quality of the object captured by the lens module.

However, in the current lens structure, a matching structure of two to three lenses is generally used, and basically all of the lenses are plastic lenses. The lens needs to cooperate with the lens barrel or other components due to the outer diameter precision problem of the glass lens. However, the combination of glass lenses is always a problem to be solved, and the assembly of the lenses with less matching is unstable, and may affect the overall performance of the lens. The existing matching methods can be improved to a great extent. In order to further improve the assembly stability and meet the accuracy requirements of the lens itself, it is urgent to provide a new type of lens module.

BRIEF DESCRIPTION OF THE DRAWINGS

Many aspects of the exemplary embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

The present disclosure will be further illustrated with reference to the accompanying drawings and the embodiments. In the embodiments described below, a direction defined by left and right sides of paper is referred to as a horizontal direction, and a direction defined by upper and lower sides of the paper and perpendicular to the horizontal direction is referred to as a vertical direction. In the present disclosure, a direction of a central axis is parallel to the vertical direction.

Figure 1:
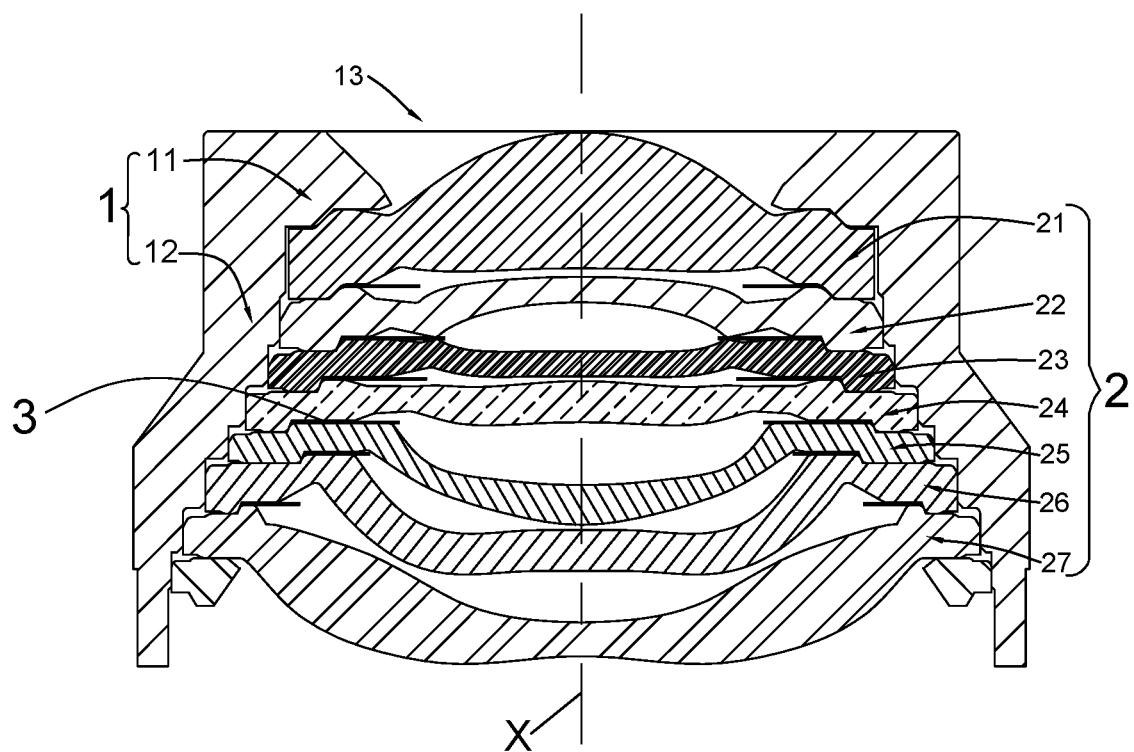
FIG. 1 is a structural cross-sectional view of a lens module of the present disclosure.

As shown in FIG. 1, the present disclosure provides a novel lens module including a lens barrel 1 and a lens group 2 received in the lens barrel 1. The lens group 2 includes a first lens 21, a second lens 22, a third lens 23, a fourth lens 24, a fifth lens 25, a sixth lens 26, and a seventh lens 27 that sequentially match each other from an object side to an image side of the lens barrel 1.

Figure 2:
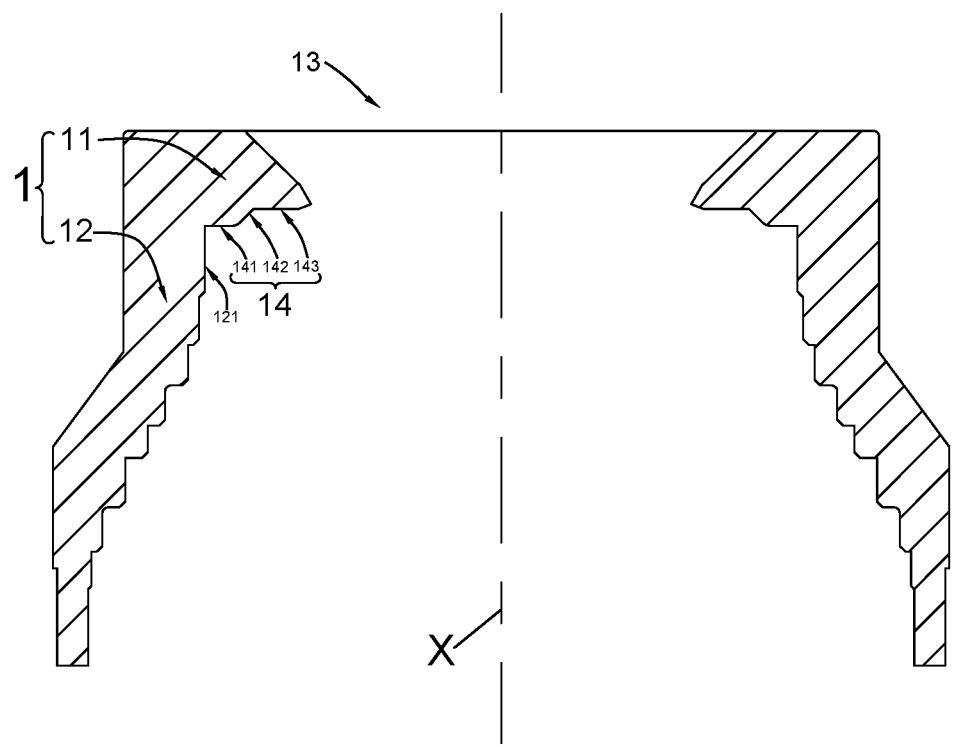
FIG. 2 is a structural cross-sectional view of a lens barrel of the present disclosure.

In the present embodiment, as shown in FIG. 2, the lens barrel 1 includes a first barrel wall 11 defining a light through hole 13 and extending in a horizontal direction, a second barrel wall 12 extending from the first barrel wall 11 while being bent. The first barrel wall 11 and the second barrel wall 12 define a receiving space. The first barrel wall 11 includes a first surface close to the object side and a second surface close to the image side. The lens barrel 1 can be an integral structure or a split structure.

Further, the first lens 21 is a glass lens, while the second lens 22, the third lens 23, the fourth lens 24, the fifth lens 25, the sixth lens 26 and the seventh lens 27 are preferably plastic lenses, or can also be plastic lenses or lenses made of other materials. Each lens includes an optical portion and a peripheral portion surrounding the optical portion. An upper surface of each lens is an object side surface. A lower surface of each lens is an image side surface. In addition, the number of lenses in the lens group 12 is not limited thereto.

In order to further improve the assembly stability of the lens and the imaging quality of the lens, the matching structures between the first lens 21 and the lens barrel 1 and between the lenses are improved. The specific solutions are described as follows.

As shown in FIG. 1 and FIG. 2, the lens module has a symmetrical shape. Therefore, the left side portion of the lens module is described in detail as an example. For example, the second surface of the first barrel wall 11 includes a barrel matching portion 14 for matching the first lens 21. The barrel matching portion 14 includes a first planar surface 141 horizontally extending from a joint between the first barrel wall 11 and the second barrel wall 12 towards an optical axis, a first oblique surface 142 obliquely extending from the first planar surface 141 towards the optical axis and towards the object side, and a second planar surface 143 horizontally extending from the first oblique surface 142 towards the optical axis. The first oblique surface 142, the first planar surface 141 and the second planar surface 143 can be connected by via an arcuate surface, or directly connected in a right angle. The second barrel wall 12 includes an inner wall surface close to the optical axis X and an outer wall surface disposed opposite to the inner wall surface. The inner wall surface of the second barrel wall 12 includes a first vertical surface 121 vertically extending from the first planar surface 141 along the optical axis X, referring to FIG. 2.

Figure 3:
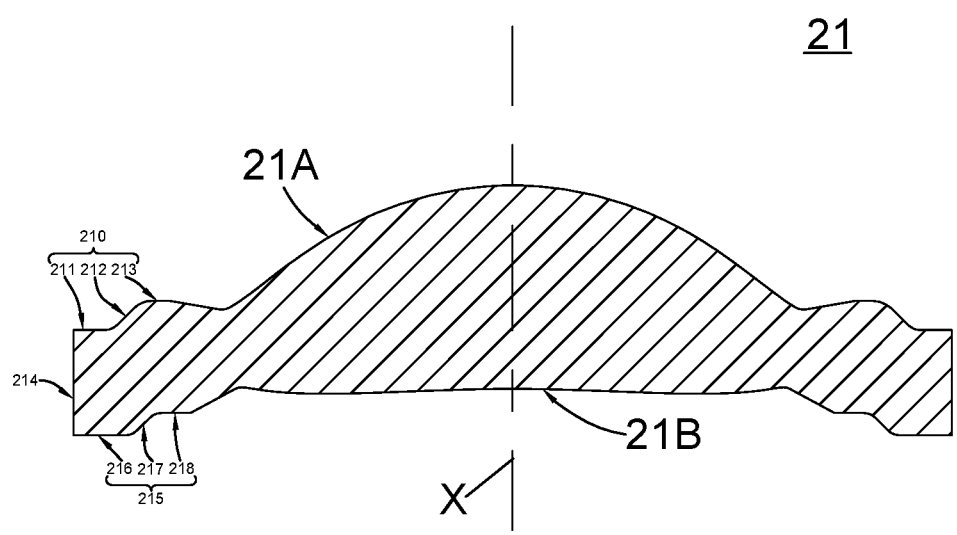
FIG. 3 is a structural cross-sectional view of a first lens of the present disclosure.

As shown in FIG. 3, the first lens 21 has a symmetrical structure. The left side portion of the first lens 21 is taken as an example. The first lens 21 has an upper surface as an object side surface 21A, and a lower surface as an image side surface 21B. The object side surface 21A of a first peripheral portion of the first lens 21 includes a first matching structure 210 for matching the lens barrel 1. The first matching structure 210 includes, for example, a third planar surface 211 horizontally extending from an edge of the first peripheral portion towards the optical axis, a second oblique surface 212 obliquely extending from the third planar surface 211 towards the optical axis and towards the object side, and a fourth planar surface 213 horizontally extending from the second oblique surface 212 towards the optical axis. The second oblique surface 212, the third planar surface 211 and the fourth planar surface 213 are be connected to one another via an arcuate surface or directly connected to each other in a right angle. The first lens 21 further includes a connection surface 214 connecting the object side surface 21A with the image side surface 21B, i.e., for connecting the upper surface with the lower surface.

In the present embodiment, when the first lens 21 and the lens barrel 1 are positioned and assembled, the first matching portion 210 of the first lens 21 match the barrel matching portion 14 of the first barrel wall 11 to assemble the first lens 21. For example, the first planar surface 141 is spaced apart from the third planar surface 211. An outer edge of the first lens 21 is spaced apart from the inner wall surface of the second lens barrel 12 (i.e., the connection surface 214 is spaced apart from the first vertical surface 121). The first oblique surface 142 is partially attached to the second oblique surface 212. A portion of the second planar surface 143 facing away from the optical axis X is attached to the fourth planar surface 213. Further, the first oblique surface 142 has the same slope as the second oblique surface 212. The slope of the second oblique surface 212 and the slope of the the third oblique surface 217 can be either equal or not.

In addition, the image side surface 21B of the first peripheral portion of the first lens 21 includes a second matching structure 215 for matching the second lens 22. The second matching structure 215 includes, for example, a fifth planar surface 216 horizontally extending from the edge of the first peripheral portion towards the optical axis, a third oblique surface 217 obliquely extending from the fifth planar surface 216 towards the optical axis and towards the object side, and a sixth planar surface 218 horizontally extending from the third oblique surface 217 towards the optical axis.

Figure 4:
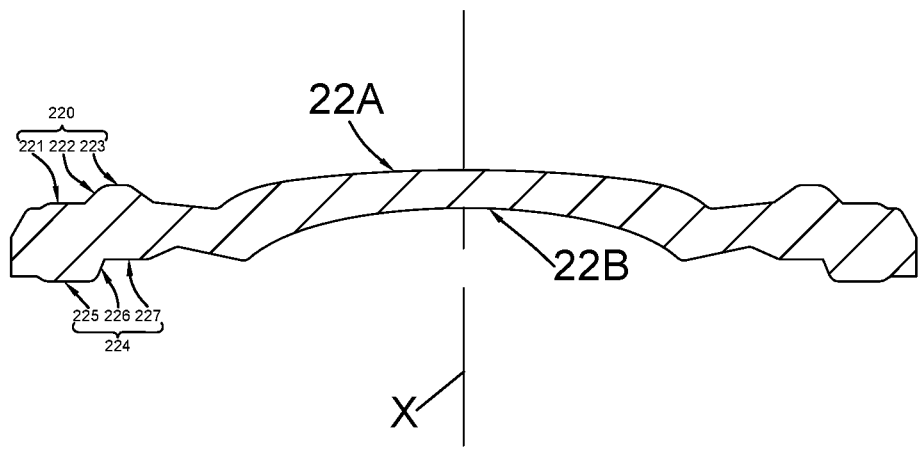
FIG. 4 is a structural cross-sectional view of a second lens of the present disclosure.

As shown in FIG. 4, the second lens 22 has an upper surface as an object side surface 22A, and a lower surface as an image side surface 22B. The second lens 22 includes a second optical portion and a second peripheral portion surrounding the second optical portion. The object side surface 22A of the second peripheral portion of the second lens 22 includes a third matching structure 220 for matching the image side surface 21B of the first lens 21. The third matching structure 220 includes, for example, a seventh planar surface 221 partially attached to the fifth planar surface 216, a fourth oblique surface 222 obliquely extending from the seventh planar surface 221 towards the optical axis and towards the object side, and an eighth planar surface 223 obliquely extending from the fourth oblique surface 222. The fourth oblique surface 222, the seventh planar surface 221 and the fourth planar surface 213 can be connected to each other via an arcuate surface or directly connected to one another in a right angle. The seventh planar surface 221 is spaced apart from an outer edge of the second lens 22. In other words, the object side surface 22A of the second lens 22 further includes a first recess portion connected to the seventh planar surface 221. The first recess portion is formed by recessing from the object side towards the image side. The first recess portion is spaced apart from the fifth planar surface 216.

In the present embodiment, the fifth planar surface 216 is partially attached to the seventh planar surface 221. The fourth oblique surface 222 is spaced apart from the third oblique surface 217. A light-shading sheet 3 is interposed in a gap formed between the sixth planar surface 218 and the eighth planar surface 223. The light-shading sheet 3 is located a position closer to the optical axis X than the third oblique surface 217. The third oblique surface 217 can have a slope equal to or different from that of the fourth oblique surface 222. The outer edge of the second lens 22 has an end surface abutting against the inner wall surface of the second barrel wall 12.

As can be seen from FIG. 4, the image side surface 22B of the second lens 22 includes a fourth matching structure 224 matching an object side surface 23A of the third lens 23. For example, the fourth matching structure 224 includes a ninth planar surface 225 attached to the object side surface 23A of the third lens 23, a fifth oblique surface 226 obliquely extending from the ninth planar surface 225 towards the optical axis and towards the object side, and a tenth planar surface 227 horizontally extending from the fifth oblique surface 226 towards the optical axis. The object side surface 23A of the third lens 23 includes an eleventh planar surface 231 opposite to the tenth planar surface 227. The light-shading sheet 3 is disposed between the tenth planar surface 227 and the eleventh planar surface 231, as shown in FIGS. 1 and 5.

Figure 5:
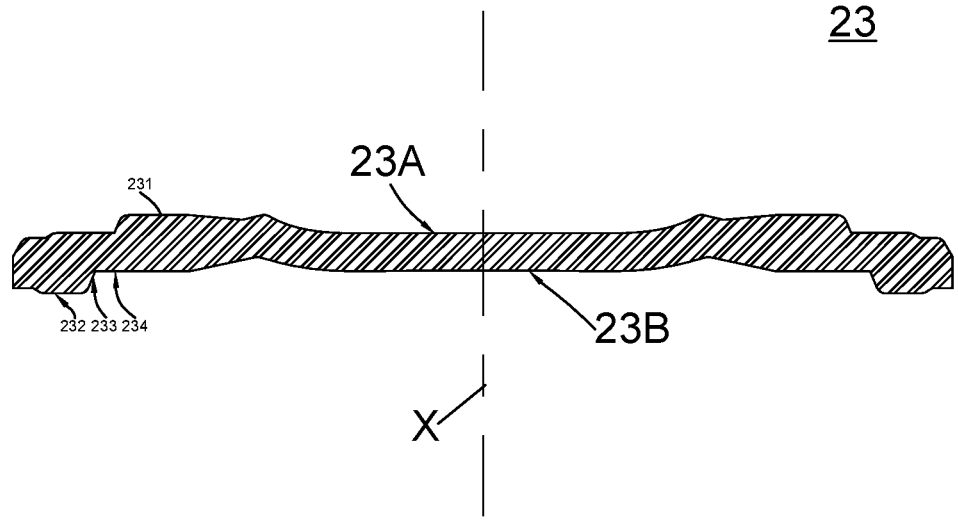
FIG. 5 is a structural cross-sectional view of a third lens of the present disclosure.

As shown in FIG. 5, in the present embodiment, the matching structure between an image side surface 23B of the third lens 23 and an object side surface 24A of the fourth lens 24 is the same as the fourth matching structure 224. Further, the image side 23B of the third lens 23 includes a twelfth planar surface 232 attached to the object side surface 24A of the fourth lens 24, a sixth oblique surface 233 obliquely extending from the twelfth planar surface 232 towards the optical axis and towards the object side, and a thirteenth planar surface 234 horizontally extending from the sixth oblique surface 233 towards the optical axis. The object side surface 24A of the fourth lens 24 includes a fourteenth planar surface 241 opposite to the thirteenth planar surface 234. The light-shading sheet 3 is disposed between the thirteenth planar surface 234 and the fourteenth planar surface 241, as shown in FIG. 1 and FIG. 6.

Figure 6:
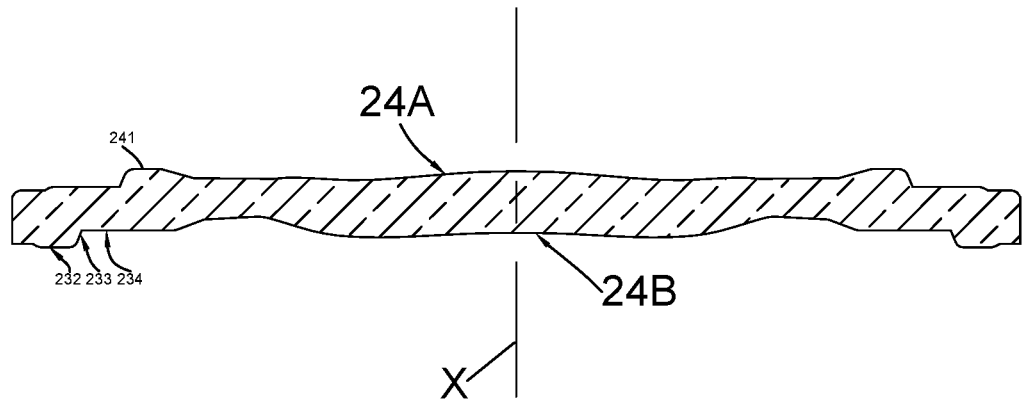
FIG. 6 is a structural cross-sectional view of a fourth lens of the present disclosure.

As shown in FIG. 6, the matching structure between an image side surface 24B of the fourth lens 24 and an object side surface 25A of the fifth lens 25 is the same as the fourth matching structure 224. Further, the image side surface 24B of the fourth lens 24 includes a fifteenth planar surface 241 attached to the object side surface 25A of the fifth lens 25, a seventh oblique surface 243 obliquely extending from the fifteenth planar surface 242 towards the optical axis and towards the object side, and a sixteenth surface 244 horizontally extending from the seventh oblique surface 243 towards the optical axis. The object side surface 25A of the fifth lens 25 includes a seventeenth planar surface 251 opposite to the sixteenth planar surface 224. The light-shading sheet 3 is disposed between the sixteenth planar surface 244 and the seventeenth planar surface 251, as shown in FIGS. 1 and 7.

Figure 7:
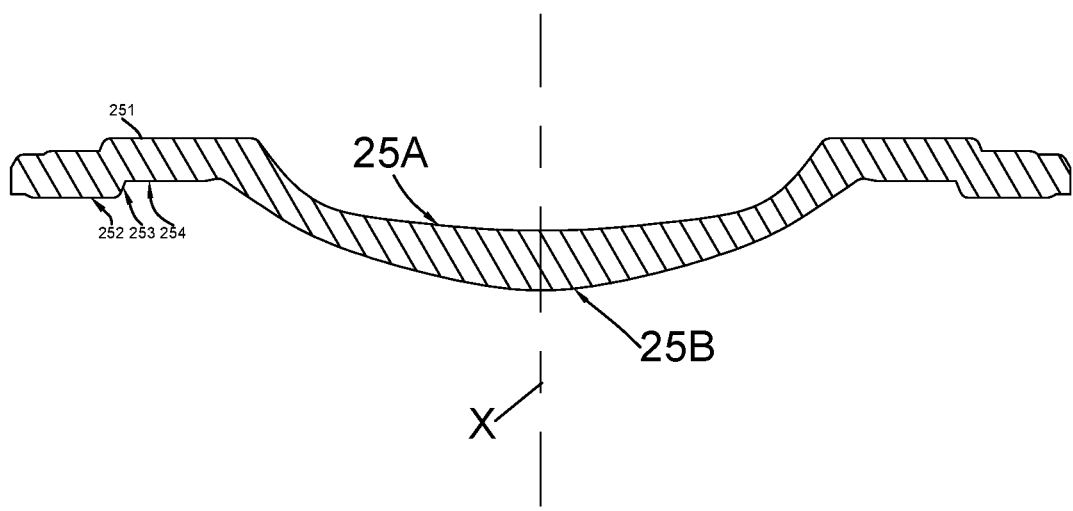
FIG. 7 is a structural cross-sectional view of a fifth lens of the present disclosure.

As shown in FIG. 7, an image side surface 25B of the fifth lens 25 and an object side surface 26A of the sixth lens 26 have the same matching structure as the fourth matching structure 224. Further, the image side surface 25B of the fifth lens 25 includes an eighteenth planar surface 252 attached to the object side surface 26A of the sixth lens 26, an eighth oblique surface 253 obliquely extending from the eighteenth planar surface 252 towards the optical axis and towards the object side, and a nineteenth planar surface 254 horizontally extending from the eighth oblique surface 253 towards the optical axis 254. The object side surface 26A of the sixth lens 26 includes a twentieth planar surface 261 opposite to the nineteenth planar surface 254. The light-shading sheet 3 is disposed between the nineteenth planar surface 254 and the twentieth planar surface 261, referring to FIG. 1 and FIG. 8.

Figure 8:
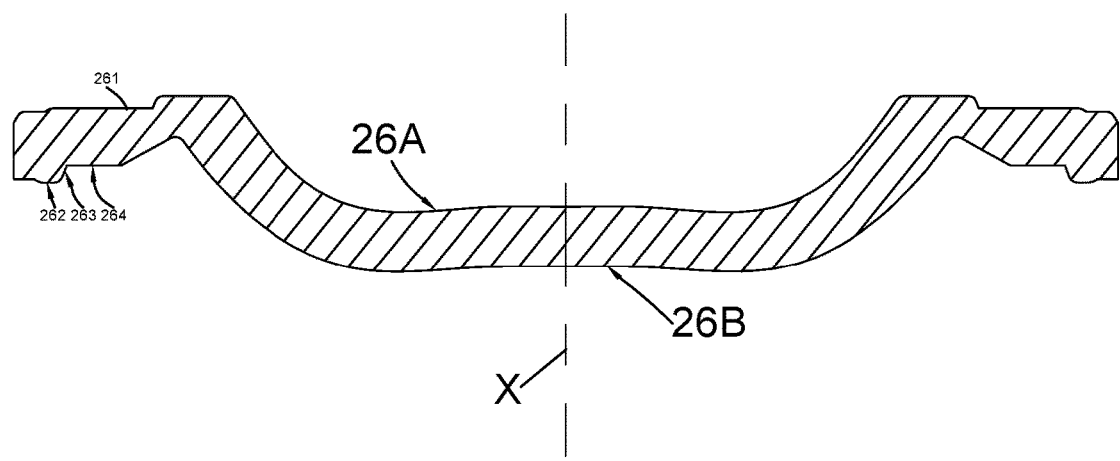
FIG. 8 is a structural cross-sectional view of a sixth lens of the present disclosure.
Figure 9:
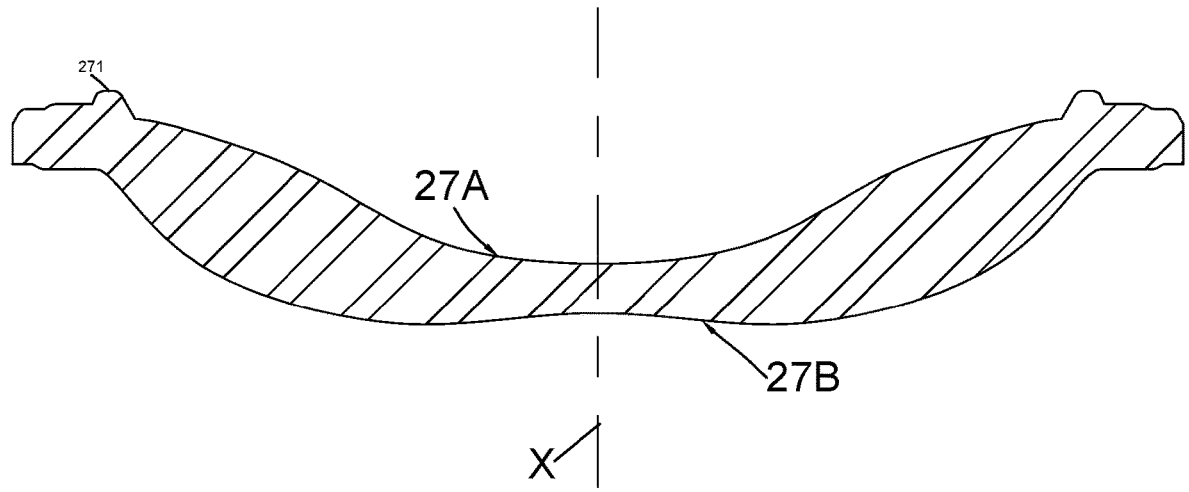
FIG. 9 is a structural cross-sectional view of a seventh lens of the present disclosure.

As shown in FIG. 8, an image side surface 26B of the sixth lens 26 includes a twenty-first planar surface 262 attached to an object side surface 27A of the seventh lens 27, a ninth oblique surface 263 obliquely extending from the twenty-first planar surface 262 towards the optical axis and towards the object side, and a twenty-second planar surface 264 horizontally extending from the ninth oblique surface 263 towards the optical axis. The object side surface of the seventh lens 27 includes a twenty-third planar surface 271 opposite to the twenty-second planar surface 264. The light-shading sheet 3 is disposed between the twenty-second planar surface 264 and the twenty-third planar surface 271, referring to FIG. 1 and FIG. 9.

In the present disclosure, the positioning and assembly of the lens group 2 and the lens barrel 1 are achieved by the mutual matching between the first lens 21 and the first barrel wall 12 and the mutual matching between any adjacent two of the seven lenses. The lens module of the present disclosure adopts a multi-matching structure design, which can improve the assembly stability of the lens and improve the overall performance of the lens module, thereby improving the imaging quality of the lens module.

In addition, the second lens 22, the third lens 23, the fourth lens 24, the fifth lens 25, the sixth lens 26, and the seventh lens 27 are fixed by pressing each other, and the outer edge portion of the image side surface of the seventh lens 27 is provided with stoppers, which can also be fixed by dispensing an adhesive or pressing ring, so that all the lenses are fixed in the lens barrel 1. It should be noted that the number of lenses in the lens group is not limited thereto.

Compared with the prior art, the lens module of the present disclosure, which adopts a multi-matching structure design, can improve the assembly stability of the lens and improve the overall performance of the lens module, thereby improving the imaging quality of the lens module.

It should be noted that, the above are merely embodiments of the present invention. Any improvement made by those skilled in the art without departing from the inventive concept of the present invention shall fall within the protection scope of the present invention.

What is claimed is:

1. A lens module, comprising: a lens barrel; and a lens group received in the lens barrel, wherein the lens barrel comprises a first barrel wall extending in a horizontal direction and a second barrel wall extending from the first barrel wall while being bent, the first barrel wall comprising a first surface close to an object side and a second surface close to an image side, the lens group comprises a first lens and a second lens that match each other from the object side to the image side, the first lens being a glass lens, the second lens being a plastic lens, and the first lens and the second lens each comprising an optical portion and a peripheral portion surrounding the optical portion, wherein the second surface of the first barrel wall comprises: a first planar surface horizontally extending from a joint between the first barrel wall and the second barrel wall towards an optical axis; a first oblique surface obliquely extending from the first planar surface towards the optical axis and towards the object side; and a second planar surface horizontally extending from the first oblique surface towards the optical axis, wherein an object side surface of the peripheral portion of the first lens comprises: a third planar surface horizontally extending from an outer edge of the first lens towards the optical axis; a second oblique surface obliquely extending from the third planar surface towards the optical axis and towards the object side; and a fourth planar surface horizontally extending from the second oblique surface towards the optical axis, the first oblique surface being attached to the second oblique surface, and the second planar surface being attached to the fourth planar surface, wherein an image side surface of the peripheral portion of the first lens comprises: a fifth planar surface horizontally extending from the outer edge of the first lens towards the optical axis; a third oblique surface obliquely extending from the fifth planar surface towards the optical axis and towards the object side; and a sixth planar surface horizontally extending from the third oblique surface towards the optical axis, wherein an object side surface of the second lens comprises: a seventh planar surface attached to the fifth planar surface; a fourth oblique surface obliquely extending from the seventh planar surface towards the optical axis and towards the object side; and an eighth planar surface horizontally extending from the fourth oblique surface towards the optical axis, the fourth oblique surface being spaced apart from the third oblique surface.

2. The lens module as described in claim 1, further comprising a light-shading sheet disposed between the sixth planar surface and the eighth planar surface.

3. The lens module as described in claim 1, wherein the lens group further comprises a third lens matching an image side surface of the second lens, the third lens being a plastic lens.

4. The lens module as described in claim 3, wherein the image side surface of the second lens comprises:
   a ninth planar surface attached to an object side surface of the third lens;
   a fifth oblique surface obliquely extending from the ninth planar surface towards the optical axis and towards the object side; and
   a tenth planar surface horizontally extending from the fifth oblique surface towards the optical axis,
   the object side surface of the third lens comprises an eleventh planar surface opposite to the tenth planar surface,
   a light-shading sheet is disposed between the tenth planar surface the eleventh planar surface.

5. The lens module as described in claim 3, further comprising a fourth lens matching an image side surface of the third lens, the fourth lens being a plastic lens.

6. The lens module as described in claim 5, wherein image side surface of the third lens comprises:
   a twelfth planar surface attached to an object side surface of the fourth lens;
   a sixth oblique surface obliquely extending from the twelfth planar surface towards the optical axis and towards the object side; and
   a thirteenth planar surface horizontally extending from the sixth oblique surface towards the optical axis,
   the object side surface of the fourth lens comprises a fourteenth planar surface opposite to the thirteenth planar surface, and
   a light-shading sheet is disposed between the thirteenth planar surface and the fourteenth planar surface.

7. The lens module as described in claim 5, further comprising a fifth lens matching an image side surface of the fourth lens, the fifth lens being a plastic lens.

8. The lens module as described in claim 7, wherein the image side surface of the fourth lens comprises:
   a fifteenth planar surface attached to an object side surface of the fifth lens;

a seventh oblique surface obliquely extending from the fifteenth planar surface towards the optical axis and towards the object side; and a sixteenth planar surface horizontally extending from the seventh oblique surface towards the optical axis, the object side surface of the fifth lens comprises a seventeenth planar surface opposite to the sixteenth planar surface, and a light-shading sheet is disposed between the sixteenth planar surface and the seventeenth planar surface.

9. The lens module as described in claim 7, further comprising a sixth lens matching an image side surface of the fifth lens, the sixth lens being a plastic lens.

10. The lens module as described in claim 9, wherein the image side surface of the fifth lens comprises:

an eighteenth planar surface attached to an object side surface of the sixth lens;

an eighth oblique surface obliquely extending from the eighteenth planar surface towards the optical axis and towards the object side; and a nineteenth planar surface horizontally extending from the eighth oblique surface towards the optical axis, the object side of the sixth lens comprises a twentieth planar surface opposite to the nineteenth planar surface, and a light-shading sheet is disposed between the nineteenth planar surface and the twentieth planar surface.

11. The lens module as described in claim 9, further comprising a seventh lens matching an image side surface of the sixth lens, the seventh lens being a plastic lens.

12. The lens module as described in claim 11, wherein the image side surface of the sixth lens comprises:

a twenty-first planar surface attached to an object side surface of the seventh lens;

a ninth oblique surface obliquely extending from the twenty-first planar surface towards the optical axis and towards the object side; and a twenty-second planar surface horizontally extending from the ninth oblique surface towards the optical axis, the object side surface of the seventh lens comprises a twenty-third planar surface opposite to the twenty-second planar surface, and a light-shading sheet is disposed between the twenty-second planar surface and the twenty-third planar surface.

\* \* \* \* \*